July 17, 1928.
A. REES
AIRCRAFT
Filed March 22, 1927
1,677,688
2 Sheets-Sheet 1
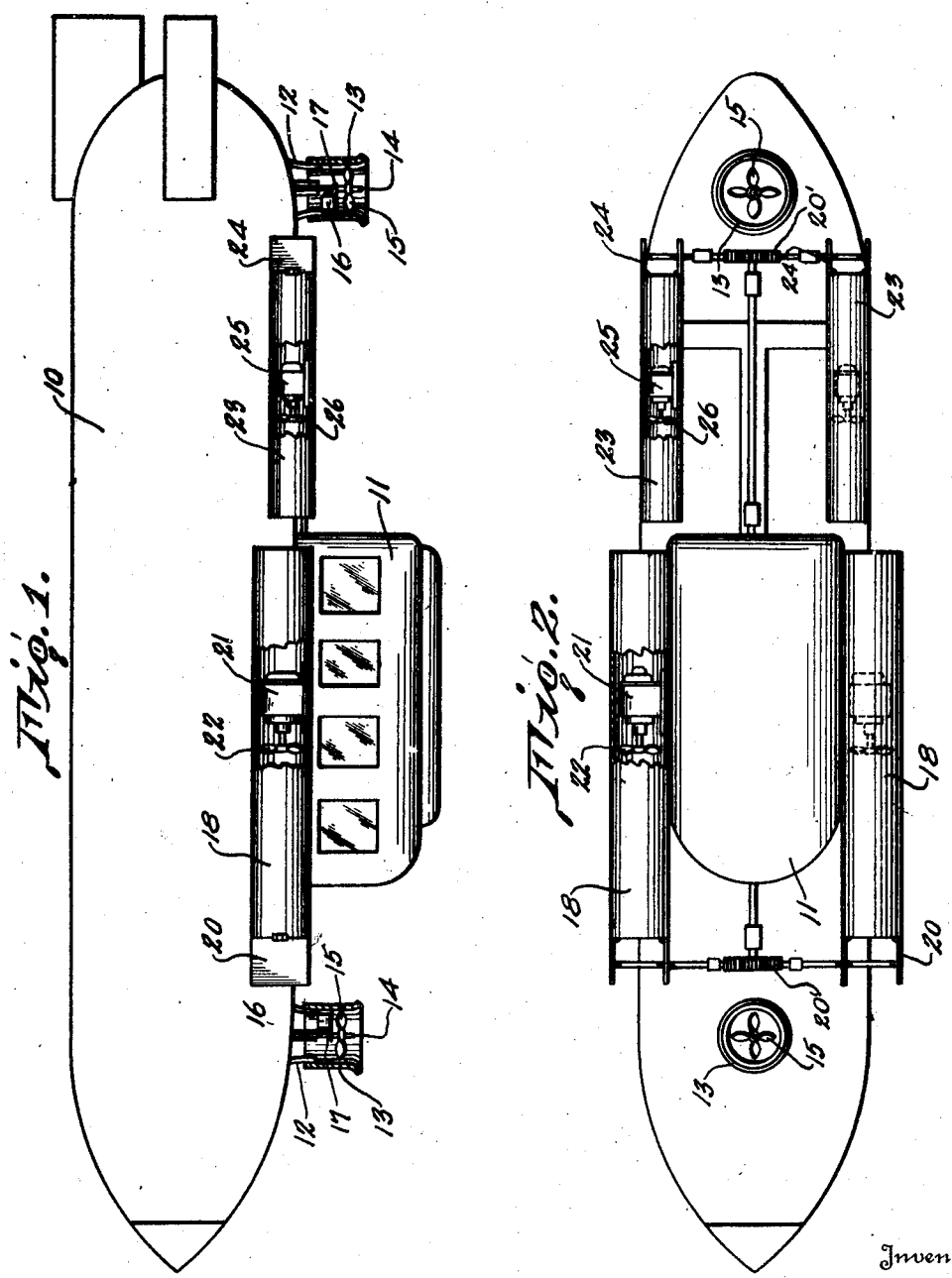
Inventor
Alphy Rees July 17, 1928.
A. REES
AIRCRAFT
Filed March 22, 1927
1,677,688
2 Sheets-Sheet 2
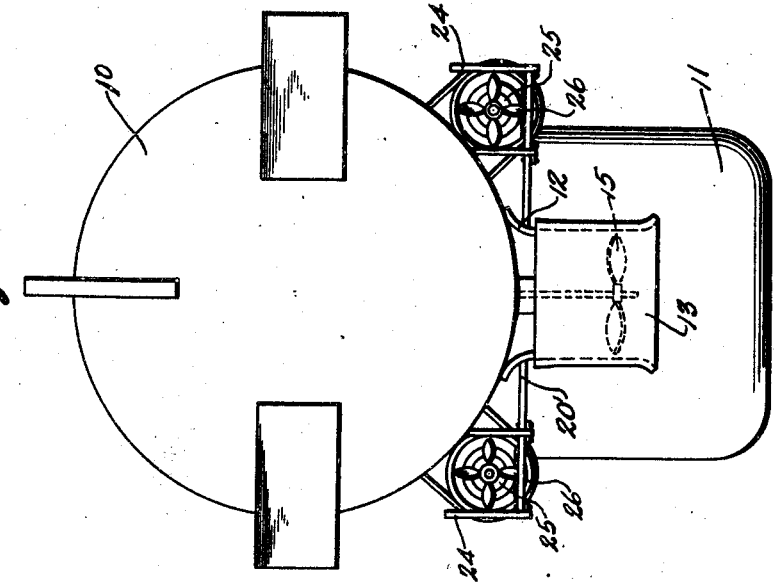
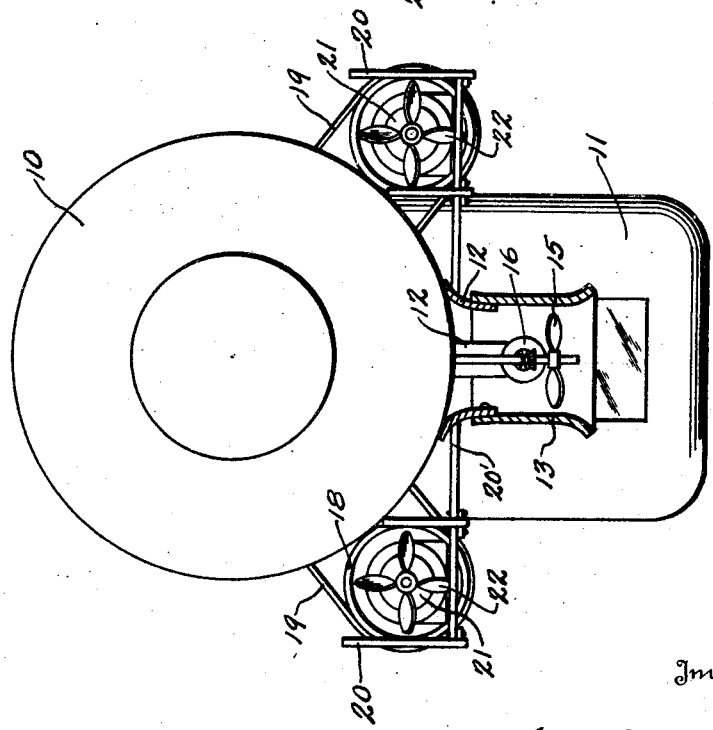
Inventor
Alphy Rees Patented July 17, 1928.

1,677,688

UNITED STATES PATENT OFFICE.

ALPHY REES, OF COALINGA, CALIFORNIA, ASSIGNOR OF ONE-THIRD TO EDWARD A. WEBB, OF COALINGA, CALIFORNIA.

AIRCRAFT.

Application filed March 22, 1927. Serial No. 177,304.

The present invention relates to improvements in aircraft and has for its primary object to provide novel propelling means to facilitate the elevation and propulsion of aircraft.

A further object of the invention is the provision of tubular casings adapted to carry the propelling mechanism to provide a more efficient as well as a more easily controllable driving apparatus.

Another object of the invention is the provision of a novel type of propulsion housing adaptable for lighter than aircraft as well as heavier than aircraft to increase the efficiency of the propelling instrumentalities.

Another object of the invention is the provision of a simple, comparatively durable casing structure of the above type adaptable for aircraft of various characters and designed to obviate the danger incident to the present type of structures.

Other objects and advantages of the invention will become apparent as the description progresses.

In the accompanying drawings, forming a part of this specification and in which like reference characters are employed to designate corresponding parts throughout the same, Figure 1 is a side elevational view of an aircraft of the lighter than air type and of dirigible design equipped with my improved casing structures, Figure 2 is a bottom plan view of the same, Figure 3 is a front elevational view partly in section, and Figure 4 is a rear elevational view of the same.

Referring to the drawings, wherein for the purpose of illustration is shown the preferred embodiment of my invention, the numeral 10 generally designates the elongated body or fuselage of a dirigible, lighter than air machine. Rigidly secured to the lower portion of the body 10 is a conventional type of pilot car 11, preferably arranged adjacent the forward end of the ship as clearly indicated in Figure 1.

An essential characteristic of my present invention resides in the provision of vertical and horizontal tubular housings or casings, in which the propellers and driving motors therefor are mounted. In this connection, the forward and rear portions of the ship carry a plurality, in the present instance four, support ribs 12 firmly secured to the frame of the ship on the longitudinal center line. Firmly secured to the ribs 12 and arranged in vertical positions are tubular housings 13 having the upper and lower edges flared outwardly and the upper edges detachably secured to the ribs. Rotatably supported by suitable brackets connected to the ship frame and extending vertically downward therefrom are propeller shafts 14 carrying horizontal propellers 15 adjacent their lower ends. Secured to the lower sides of the housings 13 are driving motors 16 of any preferred type adapted to rotate the propeller shafts 14 through the instrumentality of bevel gears 17. It will be noted that the propellers 15 are arranged substantially within the housing and are designed to assist in the elevation and lowering of the ship, thus embodying the helicopter principle.

Secured to the lower sides of the ship body 10 and arranged parallel with the pilot car 11 are a pair of longitudinal cylindrical casings 18, which may be attached to the body by brackets 19, or in any other suitable manner. The casings 18 are disposed at the forward portion of the ship and are of relatively large diameter and extend longitudinally of the ship. Hingedly connected to the forward ends of the housings 18 are rectangularly shaped rudders 20 operated by means of operating mechanism generally designated by the numeral 20'. This mechanism may embody a transversely movable rack supported on the bottom of the ship and connected with the rudders by laterally extending rods. The rudders of each casing are also connected by rods for simultaneous swinging movement. The rack meshes with a spur gear fixed on the end of a longitudinally extending shaft projecting into the pilot car for convenient operation in conjunction with the steering apparatus of the ship. Securely mounted in the intermediate portions of the housings 18 are driving motors 21 of any preferred character arranged to operatively drive propellers 22 which control the forward speed of the vehicle.

Secured to the rear portion of the ship body 10 and extending longitudinally on the lower sides thereof are auxiliary housings 23, the rear ends carrying rudders 24 hingedly connected to the housings and operated by mechanism similar to that employed for the operation of the forward rudders. Driving motors 25 are mounted in the intermediate portions of the auxiliary housings 23 arranged to rotatably operate vertical propellers 26.

From the foregoing description, it will be noted that the propelling mechanisms of the airship are mounted in tubular housings. This construction is designed to eliminate varying atmospheric conditions encountered during the movement of aircraft so as to produce a more uniform speed. The high speed revolution of the propellers will force the air rapidly through the tubular housings 18 and 23 and the ejection of the air currents through the rear ends thereof will produce an additional propelling force.

The provision of the forward and rear horizontal propelling mechanisms will eliminate what is commonly termed as valving of the ship customarily employed when it is desired to descend in lighter than air craft. By the operation of the forward or rear propelling structures, either end of the ship is elevated to direct the bag upwardly or downwardly to obviate the necessity of releasing the gas from the bag.

It is contemplated to construct the tubular housings of a relatively light frame work covered with oiled silk as is customary in the construction of aeroplane wings and the like, or of a light metallic material such as duralumin. This construction will permit a more stable control of the aircraft and also eliminate the danger of injury by the rotary propellers which are customarily exposed.

It is to be understood that the form of my invention herewith shown and described is to be taken as the preferred example of the same, and that various changes as to the shape, size, and arrangement of parts may be resorted to without departing from the spirit of the invention or the scope of the subjoined claim.

Having thus described my invention, what I claim as new is:

In an aircraft of the character described, the combination with a lighter than air body, a pair of longitudinal tubular housings secured adjacent the forward portion of the body in opposed positions on the sides thereof, a second pair of housings secured adjacent the rear end of the body of relatively decreased diameter, propelling motors secured in the intermediate portions of the housings, vertical propellers driven by the said motors, vertical tubular housings secured to the forward and rear ends of the body, motors mounted in the said vertical housings, and horizontal propellers driven by the said motors to control the ascension and descension of the said aircraft.

ALPHY REES.